US012570569B2

(12) United States Patent
Thomas et al.

(10) Patent No.: US 12,570,569 B2
(45) Date of Patent: Mar. 10, 2026

(54) HIGH-INDEX SUBSTRATES

(71) Applicant: Schott AG, Mainz (DE)

(72) Inventors: Jens Ulrich Thomas, Mainz (DE);
Frank-Thomas Lentes, Bingen (DE);
Simone Monika Ritter, Mainz (DE);
Benedikt Ziebarth, Mainz (DE)

(73) Assignee: Schott AG, Mainz (DE)

( * ) Notice: Subject to any disclaimer, the term of this
patent is extended or adjusted under 35
U.S.C. 154(b) by 328 days.

(21) Appl. No.: 18/086,026

(22) Filed: Dec. 21, 2022

(65) Prior Publication Data

US 2023/0192527 A1      Jun. 22, 2023

(30) Foreign Application Priority Data

Dec. 21, 2021    (DE) .................... 10 2021 134 139.6
Jan. 26, 2022    (DE) .................... 10 2022 101 785.0
Jun. 1, 2022    (DE) .................... 10 2022 113 837.2

(51) Int. Cl.
| | |
|---|---|
| *B32B 15/04* | (2006.01) |
| *B32B 17/06* | (2006.01) |
| *C03C 3/068* | (2006.01) |
| *C03C 4/00* | (2006.01) |
| *C03C 13/04* | (2006.01) |
| *G02B 1/02* | (2006.01) |

(52) U.S. Cl.
CPC ........... *C03C 3/068* (2013.01); *C03C 4/0092*
(2013.01); *C03C 13/045* (2013.01); *G02B 1/02*
(2013.01); *C03C 2204/00* (2013.01)

(58) Field of Classification Search
CPC ...................................................... C03C 3/068
USPC .......................................................... 428/426
See application file for complete search history.

(56) References Cited

U.S. PATENT DOCUMENTS

| | | | | |
|---|---|---|---|---|
| 11,802,073 | B2 * | 10/2023 | Luo ......................... | C03C 3/068 |
| 2020/0131077 | A1 * | 4/2020 | Takeshita .................. | C03C 3/15 |
| 2021/0061703 | A1 * | 3/2021 | Shibata ................... | C03C 3/068 |
| 2021/0130222 | A1 * | 5/2021 | Li .............................. | C03C 4/02 |
| 2021/0179479 | A1 * | 6/2021 | Amma ................ | C03C 17/3417 |
| 2021/0253470 | A1 * | 8/2021 | Mushiake .............. | C03C 3/062 |
| 2021/0340054 | A1 * | 11/2021 | Schreder ................ | C03C 3/062 |
| 2022/0033297 | A1 * | 2/2022 | Schreder ................ | C03C 3/068 |
| 2023/0083714 | A1 * | 3/2023 | Konoshita ............... | C03C 3/068 |
| | | | | 428/220 |

(Continued)

*Primary Examiner* — Lauren R Colgan
(74) *Attorney, Agent, or Firm* — TAYLOR &
EDELSTEIN, PC

(57) ABSTRACT

A glass article has a refractive index $n_G \geq 1.95$ and an
R-number in a range of from 0.900 to 1.050. The R-number
is calculated according to the following formula:

$$R = (n_G - 1) \left( \frac{\ln\left[ \frac{\lambda_G^2 - \lambda_{min}^2}{\lambda_G^2 - \lambda_{max}^2} \cdot \frac{\lambda_{max}^2}{\lambda_{min}^2} \right]}{42 \ln\left[ \frac{\lambda_B^2 - \lambda_{min}^2}{\lambda_B^2 - \lambda_{max}^2} \cdot \frac{\lambda_R^2 - \lambda_{max}^2}{\lambda_R^2 - \lambda_{min}^2} \right]} + \frac{1}{2.8} \right).$$

$\lambda_R$=656 nm, $\lambda_G$=587 nm and $\lambda_B$=486 nm, $\lambda_{min}$=33 nm,
and $n_G$ is a refractive index of the glass article at a
wavelength of 587 nm.

14 Claims, 1 Drawing Sheet

F

(56) References Cited

U.S. PATENT DOCUMENTS

2024/0343634 A1 * 10/2024 Kuang .................... C03C 3/068

* cited by examiner

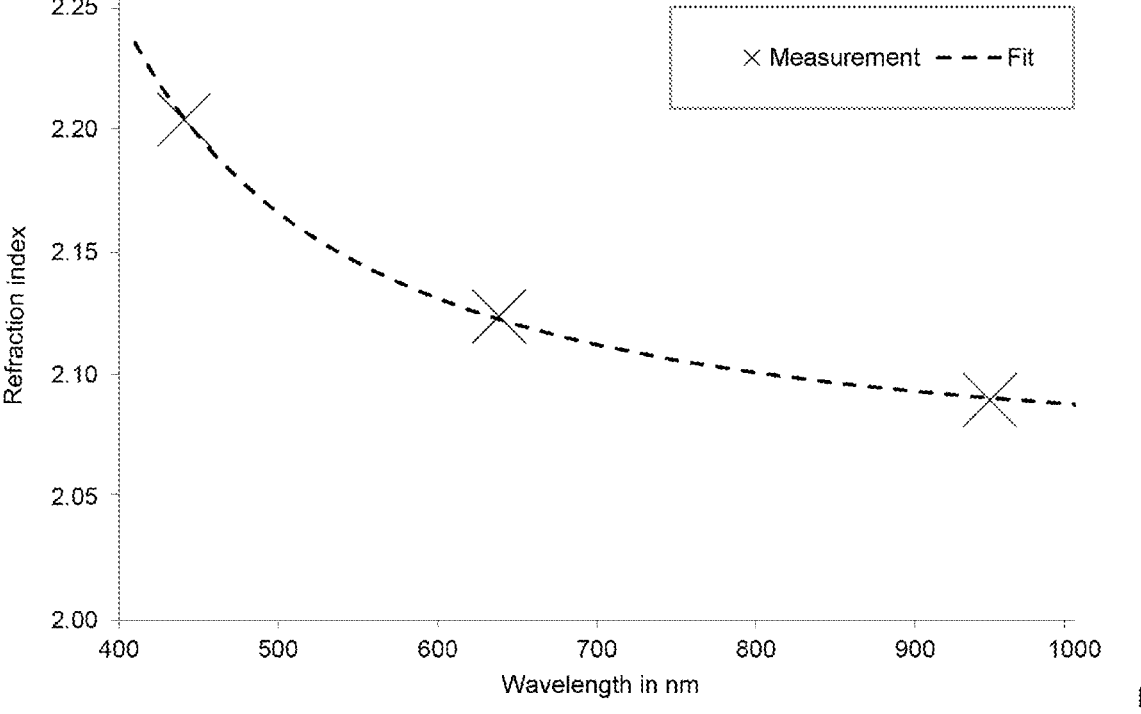
F

HIGH-INDEX SUBSTRATES

CROSS REFERENCE TO RELATED APPLICATIONS

This application claims priority to German Patent Application No. DE 10 2022 133 837.2 filed on Jun. 1, 2022, which is incorporated in its entirety herein by reference. This application also claims priority to German Patent Application No. DE 10 2022 101 785.0 filed on Jan. 26, 2022, which is incorporated in its entirety herein by reference. This application also claims priority to German Patent Application No. DE 10 2021 134 139.6 filed on Dec. 21, 2021, which is incorporated in its entirety herein by reference.

BACKGROUND OF THE INVENTION

1. Field of the Invention

The present invention relates to high-index glass substrates having optimized light guiding properties for "augmented reality" and "mixed reality" devices, in particular having a high transmission between the UV band edge and 430 nm.

2. Description of the Related Art

"Augmented reality" or AR means the augmentation of the visually perceived reality by optical overlays of augmenting objects, features or information with the aid of AR eyeglasses. In "mixed reality", environments or systems which mix the natural perception of a user with an artificial (computer-generated) perception are combined.

AR eyeglasses as so-called "near-eye displays" consist of at least one (planar) thin light-guiding plate into which the image is coupled, is transported by total internal reflections at the glass/air interface and is projected through optical gratings or semi-reflective mirror facets to the pupil of the eye.

In order to be able to image an apparent field of view which is as large as possible, the condition for total internal reflection must be fulfilled for an angle range which is as large as possible; the critical angle $$\alpha_{tot} = \arcsin\frac{1}{n}$$

for total internal reflection must be as small as possible. For this purpose, the refractive index n must be as high as possible. However, increasing the refractive index also entails an impairment of the transmission properties, particularly in the blue spectral range. What is needed in the art is a way to balance these two factors for glass substrates for an optimal overall performance of the AR eyeglasses produced therefrom.

SUMMARY OF THE INVENTION

In some exemplary embodiments provided according to the invention, a glass article has a refractive index $n_G \geq 1.95$ and an R-number in a range of from 0.900 to 1.050. The R-number is calculated according to the following formula:

$$R = (n_G - 1)\left(\frac{\ln\left[\frac{\lambda_G^2 - \lambda_{min}^2}{\lambda_G^2 - \lambda_{max}^2} \cdot \frac{\lambda_{max}^2}{\lambda_{min}^2}\right]}{42\ln\left[\frac{\lambda_B^2 - \lambda_{min}^2}{\lambda_B^2 - \lambda_{max}^2} \cdot \frac{\lambda_R^2 - \lambda_{max}^2}{\lambda_R^2 - \lambda_{min}^2}\right]} + \frac{1}{2.8}\right).$$

$\lambda_R$=656 nm, $\lambda_G$=587 nm and $\lambda_B$=486 nm, $\lambda_{min}$=33 nm, and $n_G$ is a refractive index of the glass article at a wavelength of 587 nm.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawing, wherein:

The sole FIGURE illustrates measurement values of a refractive index and, as a dashed curve, a fit of the measurement data to Equation 1 disclosed herein. $\lambda_m$ax may be ascertained in determined fashion therefrom.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

The purpose of a light-guiding plate, which may be made from one or more high-index glass substrates, is to guide light beams with the least possible perturbations from the input aperture to one or more output apertures. In what follows, perturbations are considered which impair the brightness, the contrast and the color fidelity. This relates to the VIS spectral range visible to the human eye, which extends from about 400 nm to 700 nm. Here, in particular, the shortwave blue range of from 430 nm to 480 nm is a technical challenge since here both the sensitivity of the human retina is low and the luminance of the conventional microdisplays, that is to say of micro-LEDs, micro-OLED and LCOS displays, is low.

Optionally, the pure transmission $\tau_i$ with a wavelength of 460 nm and a layer thickness d of 1 cm is >0.9. The absorption coefficient is then $\alpha$<0.1/cm. Optionally, the absorption coefficient $\alpha$ with a wavelength of 460 nm is at most 0.09/cm, at most 0.08/cm, at most 0.07/cm, at most 0.06/cm, at most 0.05/cm, at most 0.04/cm or at most 0.03/cm. The absorption coefficient $\alpha$ with a wavelength of 460 nm may, for example, be at least 0.001/cm, at least 0.005/cm, at least 0.01/cm or at least 0.02/cm. The absorption coefficient $\alpha$ with a wavelength of 460 nm may for example lie in a range of from 0.001/cm to <0.1/cm, from 0.001/cm to 0.09/cm, from 0.005/cm to 0.08/cm, from 0.005/cm to 0.07/cm, from 0.01/cm to 0.06/cm, from 0.01/cm to 0.05/cm, from 0.02/cm to 0.04/cm or from 0.02/cm to 0.03/cm. The pure transmission $\tau_i$ with a wavelength of 460 nm and a layer thickness d of 1 cm may, for example, be more than 0.90, at least 0.91, at least 0.92, at least 0.93, at least 0.94, at least 0.95, at least 0.96 or at least 0.97. The pure transmission $\tau_i$ with a wavelength of 460 nm and a layer thickness d of 1 cm may, for example, be at most 0.999, at most 0.995, at most 0.99 or at most 0.98. The pure transmission $\tau_i$ with a wavelength of 460 nm and a layer thickness d of 1 cm may for example lie in a range of from >0.90 to 0.999, from 0.91 to 0.999, from 0.92 to 0.995, from 0.93 to 0.9995, from 0.94 to 0.99, from 0.95 to 0.99, from 0.96 to 0.98 or from 0.97 to 0.98.

When a "layer thickness" is referred to, this relates in particular to the thickness of the specimen on which the parameter may be measured. The layer thickness does not relate to the actual thickness of the glass article. The thickness of the glass article is not restricted to this layer thickness. Rather, the layer thickness may serve as a reference thickness for the specification of the pure transmission values.

The terms "refractive index" and "refraction index" are used synonymously in the present disclosure. The refraction index $n_G$ and the refractive index $n_G$ relate to the refractive index with a wavelength of 587 nm. The "G" in this context stands for "Green".

Surprisingly, both the transmission properties in the visible spectral range and the refraction index of the glass $n_G$ may be controlled by the position $\lambda_{max}$ of the UV band edge of the glass. This may be expressed by the R-number according to the invention.

$$R = (n_G - 1)\left(\frac{\ln\left[\frac{\lambda_G^2 - \lambda_{min}^2}{\lambda_G^2 - \lambda_{max}^2} \cdot \frac{\lambda_{max}^2}{\lambda_{min}^2}\right]}{42 \ln\left[\frac{\lambda_B^2 - \lambda_{min}^2}{\lambda_B^2 - \lambda_{max}^2} \cdot \frac{\lambda_R^2 - \lambda_{max}^2}{\lambda_R^2 - \lambda_{min}^2}\right]} + \frac{1}{2.8}\right)$$

Here (corresponding to the use below) $\lambda_R = 656$ nm, $\lambda_G = 587$ nm and $\lambda_B = 486$ nm are selected. For the range of R considered here, the empirically determined wavelength $\lambda_{min}$ is almost constant and may be set to 33 nm.

Optionally, the refractive index is determined with a refractometer, in particular with a V-block refractometer. In this case, in particular, specimens having a square or approximately square base area (for example with dimensions of about 20 mm×20 mm×5 mm) may be used. During the measurement with a V-block refractometer, the specimens are generally placed in a V-shaped block prism having a known refractive index. The refraction of an incident light beam depends on the difference between the refractive index of the specimen and the refractive index of the V-block prism, so that the refractive index of the specimen can be determined. The measurement is optionally carried out at a temperature of 22° C.

Surprisingly, only glasses in a narrow range of R exhibit optimal properties: for large R-numbers, although the possible image field increases significantly, the transmission in the blue spectral range suffers, which leads overall to darkening of the image guided through the substrate. Furthermore, particularly when using chromatically corrected input and output optics (for example by means of meta-structures) significant color-dependent distortion effects in the transverse or longitudinal direction occur at the image edge. For small R-numbers, the images are transmitted more brightly and with less perturbation through the glass, but the apparent field of view becomes significantly narrower. This means that the image section with the virtual objects is significantly smaller for the viewer than the field of view of the real image. The immersion suffers from the so-called "clipping" of the virtual objects at the apparent field of view edge. Glasses having an R-number in a range of from 0.900 to 1.050, from 0.905 to 1.045, from 0.910 to 1.040, from 0.915 to 1.035, from 0.920 to 1.030, from 0.925 to 1.025, from 0.930 to 1.020, from 0.935 to 1.015, from 0.940 to 1.010, from 0.945 to 1.005, from 0.950 to 1.000, from 0.955 to 0.995, from 0.960 to 0.990, or from >0.965 to <0.985 are therefore surprisingly advantageous. The R-number is optionally at least 0.900, at least 0.905, at least 0.910, at least 0.915, at least 0.920, at least 0.925, at least 0.930, at least 0.935, at least 0.940, at least 0.945, at least 0.950, at least 0.955, at least 0.960, or optionally >0.965. The R-number is optionally at most 1.050, at most 1.045, at most 1.040, at most 1.035, at most 1.030, at most 1.025, at most 1.020, at most 1.015, at most 1.010, at most 1.005, at most 1.000, at most 0.995, at most 0.990, or optionally <0.985. An R-number in a range of from >0.965 to <0.985 may be particularly advantageous.

In order to determine the R-number, the UV band edge $\lambda_{max}$ must be determined. Although a direct measurement in the UV range may be carried out with existing measuring instruments (for example Perkin-Elmer Lambda 900), this is technically very demanding for two reasons. On the one hand, the measurement needs to be carried out in a vacuum since the UV radiation is otherwise absorbed by the air molecules. On the other hand, the absorption of the glasses in this wavelength range is also so great that the glass specimens need to be ground down very thinly in order to actually achieve a meaningful signal/noise ratio during measurements in transmission.

Instead of directly measuring the course of the spectral absorption in the vacuum UV (VUV), that is to say in the wavelength range of from 10 nm to 200 nm, this wavelength range may as an approximation be interpolated by using the Kramers-Kronig relations. This is done by approximating the VUV absorption by a box profile. On the basis of the Kramers-Kronig relations, the following relationship may then be established for the refraction index in the visible spectral range:

$$n(\lambda) = c \cdot \ln\left[\frac{\lambda^2 - \lambda_{min}^2}{\lambda^2 - \lambda_{max}^2} \cdot \frac{\lambda_{max}^2}{\lambda_{min}^2}\right] + 1. \tag{Eq. 1}$$

The following method for determining the band edge $\lambda_{max}$ is therefore based on a measurement of the refraction index in the visible range.

Several methods are available for measuring the refraction indices of glasses in the visible range; the most common one is the aforementioned V-block method for the economical measurement up to 5 valid decimal places. For more accurate measurements, goniometers are generally used according to the principle of least deviation for a multiplicity of wavelengths; in this case, an accuracy of up to 6 decimal places is achieved. For fast routine measurements, the Abbe refractometer or else prism couplers (for example the company Metricon, Model 2020) may be used; the achievable accuracy is 4 decimal places. In each of the aforementioned measurement methods, the measurement is optionally carried out at a temperature of 22° C.

First, the refraction index needs to be determined at at least three wavelengths $\lambda_1$, $\lambda_2$, $\lambda_3$ in the spectral range of from 400 nm to 1000 nm with one of the aforementioned methods. The parameters $\lambda_{max}$ and c may be ascertained in determined fashion therefrom by adaptation/fitting to Equation 1. This is done by the method of least squares, that is to say with the refraction indices $n_i$ measured at the wavelengths $\lambda_i$, $\Sigma_i(n_i - n(\lambda_i))^2 \to 0$ is minimised, with according to Equation 1

$$n(\lambda) = c \cdot \ln\left[\frac{\lambda^2 - \lambda_{min}^2}{\lambda^2 - \lambda_{max}^2} \cdot \frac{\lambda_{max}^2}{\lambda_{min}^2}\right] + 1.$$

Optionally, the refraction index is determined at precisely three wavelengths $\lambda_1$, $\lambda_2$, $\lambda_3$ in the spectral range of from 400 nm to 1000 nm, with in particular $\lambda_1$=486 nm, $\lambda_2$=587 nm and $\lambda_3$=656 nm or $\lambda_1$=441 nm, $\lambda_2$=639 nm and $\lambda_3$=947 nm.

The parameter $\lambda_{min}$=33 nm is assumed to be constant.

In some exemplary embodiments provided according to the present disclosure, a glass article has a refractive index $n_G$>1.95 and an R-number in a range of from 0.900 to 1.050, the R-number being calculated by $$R = (n_G - 1)\left(\frac{\ln\left[\frac{\lambda_G^2 - \lambda_{min}^2}{\lambda_G^2 - \lambda_{max}^2} \cdot \frac{\lambda_{max}^2}{\lambda_{min}^2}\right]}{42 \ln\left[\frac{\lambda_B^2 - \lambda_{min}^2}{\lambda_B^2 - \lambda_{max}^2} \cdot \frac{\lambda_R^2 - \lambda_{max}^2}{\lambda_R^2 - \lambda_{min}^2}\right]} + \frac{1}{2.8}\right)$$

where $\lambda_R$=656 nm, $\lambda_G$=587 nm and $\lambda_B$=486 nm, where $\lambda_{min}$=33 nm and where $n_G$ is the refractive index at a wavelength of 587 nm.

The present invention is not restricted to particular glass compositions. The compositions described further herein have, however, proven advantageous. The increase according to the invention of the refraction index $n_G$ may, in particular, be carried out using the components $La_2O_3$, $Nb_2O_5$, $TiO_2$, $Gd_2O_3$ and/or $ZrO_2$. According to the invention, the band edge of the overall glass $\lambda_{max}$ may be kept particularly low. Adjusting the sum of the proportions of $La_2O_3$, $Y_2O_3$, $Gd_2O_3$, $Yb_2O_3$ and $Lu_2O_3$ has proven advantageous for adjusting the R-number. The R-number may be achieved by increasing the proportion of one or more of these components. Further oxides that are otherwise conventional, for example $Al_2O_3$, CaO, $K_2O$, SrO, $WO_3$ and/or $Ta_2O_5$, are however advantageously not used or are used only in smaller proportions. Components such as BaO, $WO_3$, alkali metals, other alkaline earth metals and/or ZnO may however be used (partly optionally in small amounts) in order to increase the entropy in the system and therefore the glass formation.

Exemplary components for the glass formation are $SiO_2$ and/or $B_2O_3$. The sum of the proportions of $SiO_2$ and $B_2O_3$ is optionally greater than 0 mol % and may in particular be at least 3.5 mol %. The sum of the proportions of $SiO_2$ and $B_2O_3$ is optionally at least 5.0 mol %, at least 7.5 mol %, at least 8.0 mol %, more than 8.0 mol %, at least 9.0 mol % or at least 10.0 mol %. The sum of the proportions of $SiO_2$ and $B_2O_3$ may, for example, be at most 27.5 mol %, at most 25.0 mol %, at most 22.5 mol %, at most 20.0 mol %, less than 20.0 mol %, at most 19.0 mol %, at most 18.0 mol %, at most 17.5 mol %, at most 17.0 mol % or at most 16.5 mol %. The sum of the proportions of $SiO_2$ and $B_2O_3$ may, for example, lie in a range of from >0 mol % to 27.5 mol %, from 3.5 mol % to 25.0 mol %, from 5.0 mol % to 22.5 mol %, from 7.5 mol % to 20.0 mol %, from 8.0 mol % to 19.0 mol %, from >8.0 mol % to 18.0 mol %, from 9.0 mol % to 18.0 mol %, from 10.0 mol % to 17.5 mol %, from 10.0 mol % to 17.0 mol % or from 10.0 mol % to 16.5 mol %.

$SiO_2$ is a glass former. The component contributes to the chemical resistance. If it is used in very large amounts, the refractive indices according to the invention cannot be achieved. The glass optionally contains $SiO_2$ with a proportion of from 1.0 mol % to 19.0 mol %, from 1.0 mol % to 18.0 mol %, from 1.0 mol % to 16.5 mol %, from 1.5 mol % to 16.0 mol %, from 2.0 mol % to 16.0 mol %, from 2.5 mol % to 15.5 mol %, or from 3.0 mol % to 15.0 mol %. The proportion of $SiO_2$ may, for example, be at least 1.0 mol %, at least 1.5 mol %, at least 2.0 mol %, at least 2.5 mol % or at least 3.0 mol %. The proportion of $SiO_2$ may, for example, be at most 19.0 mol %, at most 18.0 mol %, at most 16.5 mol %, at most 16.0 mol %, at most 15.5 mol % or at most 15.0 mol %.

$B_2O_3$ likewise acts as a glass former. Optionally, the proportion of $B_2O_3$ lies in a range of from 0.0 mol % to 19.0 mol %, from 0.0 mol % to 17.0 mol %, from 0.0 mol % to 15.0 mol %, from 0.0 mol % to 13.5 mol %, from 0.5 mol % to 13.0 mol %, from 1.0 mol % to 12.5 mol %, from 1.5 mol % to 12.0 mol % or from 2.0 mol % to 12.0 mol %. The proportion of $B_2O_3$ may, for example, be at least 0.5 mol %, at least 1.0 mol %, at least 1.5 mol % or at least 2.0 mol %. The proportion of $B_2O_3$ may, for example, be at most 19.0 mol %, at most 17.0 mol %, at most 15.0 mol %, at most 13.5 mol %, at most 13.0 mol %, at most 12.5 mol % or at most 12.0 mol %. In some embodiments, the proportion of $B_2O_3$ may be limited to at most 10.0 mol %, at most 7.5 mol %, at most 5.0 mol %, at most 2.5 mol % or at most 1.0 mol % or the glass may be free of $B_2O_3$.

Besides other components, an addition of BaO may increase the entropy in the glass system and therefore contribute to the glass formation. The presence of BaO in the glass may also be helpful for making the viscosity higher and steeper in the highly viscous range beyond about $10^6$ dPas to $10^{14}$ dPas. In connection with particularly high-index glass systems, however, BaO in particularly large proportions may have a refraction value-reducing effect. Optionally, the glass contains BaO in a proportion of from 1.0 mol % to 20.0 mol %, from 2.0 mol % to 18.0 mol %, from 3.0 mol % to 17.0 mol % or from 4.0 mol % to 16.0 mol %. The proportion of BaO may, for example, be at least 1.0 mol %, at least 2.0 mol %, at least 3.0 mol % or at least 4.0 mol %. The proportion of BaO may, for example, be at most 20.0 mol %, at most 18.0 mol %, at most 17.0 mol % or at most 16.0 mol %. In some embodiments, the proportion of BaO may be limited to at most 10.0 mol %, at most 7.5 mol %, at most 5.0 mol %, at most 2.5 mol % or at most 1.0 mol % or the glass may be free of BaO.

$La_2O_3$ is one of the components with which the band edge $\lambda_{max}$ may be kept particularly low and a particularly high R-number may be achieved. Furthermore, the refractive index $n_G$ may be increased by using $La_2O_3$. Optionally, the glass contains $La_2O_3$ in a proportion of from 5.0 mol % to 20.0 mol %, from 7.0 mol % to 18.0 mol %, from 8.0 mol % to 17.0 mol % or from 8.5 mol % to 16.0 mol %. The proportion of $La_2O_3$ may, for example, be at least 5.0 mol %, at least 7.0 mol %, at least 8.0 mol % or at least 8.5 mol %. The proportion of $La_2O_3$ may, for example, be at most 20.0 mol %, at most 18.0 mol %, at most 17.0 mol % or at most 16.0 mol %.

$Nb_2O_5$ is one of the components with which the refractive index $n_G$ may be increased. Optionally, the glass contains $Nb_2O_5$ in a proportion of from 0.1 mol % to 20.0 mol %, from 0.5 mol % to 18.0 mol %, from 1.0 mol % to 17.0 mol % or from 2.0 mol % to 16.0 mol %. The proportion of $Nb_2O_5$ may, for example, be at least 0.1 mol %, at least 0.5 mol %, at least 1.0 mol % or at least 2.0 mol %. The proportion of $Nb_2O_5$ may, for example, be at most 20.0 mol %, at most 18.0 mol %, at most 17.0 mol % or at most 16.0 mol %.

$TiO_2$ is one of the components with which the refractive index $n_G$ may be increased. Optionally, the glass contains $TiO_2$ in a proportion of from 28.0 mol % to 65.0 mol %, from 30.0 mol % to 62.5 mol %, from 32.0 mol % to 60.0 mol % or from 34.0 mol % to 59.0 mol %. The proportion of $TiO_2$ may, for example, be at least 28.0 mol %, at least 30.0 mol %, at least 32.0 mol % or at least 34.0 mol %. The proportion of $TiO_2$ may, for example, be at most 65.0 mol %, at most 62.5 mol %, at most 60.0 mol % or at most 59.0 mol %.

$ZrO_2$ is one of the components with which the refractive index $n_G$ may be increased. Optionally, the glass contains $ZrO_2$ in a proportion of from 1.0 mol % to 11.0 mol %, from 2.0 mol % to 10.0 mol %, from 3.0 mol % to 9.5 mol % or from 4.0 mol % to 9.0 mol %. The proportion of $ZrO_2$ may, for example, be at least 1.0 mol %, at least 2.0 mol %, at least 3.0 mol % or at least 4.0 mol %. The proportion of $ZrO_2$ may, for example, be at most 11.0 mol %, at most 10.0 mol %, at most 9.5 mol % or at most 9.0 mol %.

$Gd_2O_3$ is one of the components with which the band edge $\lambda_{max}$ may be kept particularly low and a particularly high R-number may be achieved. Furthermore, the refractive index $n_G$ may be increased by using $Gd_2O_3$. Optionally, the proportion of $Gd_2O_3$ lies in a range of from 0.0 mol % to 8.0 mol %, from 0.0 mol % to 7.0 mol %, from 0.0 mol % to 6.0 mol %, from 0.0 mol % to 5.0 mol %, from 0.1 mol % to 7.0 mol %, from 0.5 mol % to 6.0 mol % or from 1.0 mol % to 5.0 mol %. The proportion of $Gd_2O_3$ may, for example, be at least 0.1 mol %, at least 0.5 mol % or at least 1.0 mol %. The proportion of $Gd_2O_3$ may, for example, be at most 8.0 mol %, at most 7.0 mol %, at most 6.0 mol % or at most 5.0 mol %. In some embodiments, the proportion of $Gd_2O_3$ may be limited to at most 4.0 mol %, at most 3.0 mol %, at most 2.0 mol %, at most 1.0 mol % or at most 0.5 mol % or the glass may be free of $Gd_2O_3$.

$Y_2O_3$ is one of the components with which the band edge $\lambda_{max}$ may be kept particularly low and a particularly high R-number may be achieved. Optionally, the proportion of $Y_2O_3$ lies in a range of from 0.0 mol % to 5.0 mol %, from 0.0 mol % to 4.0 mol %, from 0.0 mol % to 3.0 mol %, from 0.0 mol % to 2.0 mol %, or from 0.1 mol % to 4.0 mol %, from 0.2 mol % to 3.0 mol % or from 0.5 mol % to 2.0 mol %. The proportion of $Y_2O_3$ may, for example, be at least 0.1 mol %, at least 0.2 mol % or at least 0.5 mol %. The proportion of $Y_2O_3$ may, for example, be at most 5.0 mol %, at most 4.0 mol %, at most 3.0 mol % or at most 2.0 mol %. In some embodiments, the proportion of $Y_2O_3$ may be limited to at most 1.5 mol %, at most 1.0 mol %, at most 0.5 mol % or at most 0.2 mol % or the glass may be free of $Y_2O_3$.

Besides other components, an addition of ZnO may increase the entropy in the glass system and therefore contribute to the glass formation. Optionally, the proportion of ZnO lies in a range of from 0.0 mol % to 5.0 mol %, from 0.0 mol % to 4.0 mol %, from 0.0 mol % to 3.0 mol %, from 0.0 to 2.0 mol %, or from 0.1 mol % to 4.0 mol %, from 0.2 mol % to 3.0 mol % or from 0.5 mol % to 2.0 mol %. The proportion of ZnO may, for example, be at least 0.1 mol %, at least 0.2 mol % or at least 0.5 mol %. The proportion of ZnO may, for example, be at most 5.0 mol %, at most 4.0 mol %, at most 3.0 mol % or at most 2.0 mol %. In some embodiments, the proportion of ZnO may be limited to at most 1.5 mol %, at most 1.0 mol %, at most 0.5 mol % or at most 0.2 mol % or the glass may be free of ZnO.

Besides other components, an addition of $WO_3$ may increase the entropy in the glass system and therefore contribute to the glass formation. Optionally, the proportion of $WO_3$ lies in a range of from 0.0 mol % to 5.0 mol %, from 0.0 mol % to 4.0 mol %, from 0.0 mol % to 3.0 mol %, from 0.0 mol % to 2.0 mol %, from 0.1 mol % to 4.0 mol %, from 0.2 mol % to 3.0 mol % or from 0.5 mol % to 2.0 mol %. The proportion of $WO_3$ may, for example, be at least 0.1 mol %, at least 0.2 mol % or at least 0.5 mol %. The proportion of $WO_3$ may, for example, be at most 5.0 mol %, at most 4.0 mol %, at most 3.0 mol % or at most 2.0 mol %, at most 1.5 mol %, at most 1.0 mol %, at most 0.5 mol % or at most 0.2 mol %. Optionally, the glass is free of $WO_3$.

$Al_2O_3$ contributes to the glass formation. Optionally, the proportion of $Al_2O_3$ lies in a range of from 0.0 mol % to 3.0 mol %, for example from 0.0 to 2.5 mol %, from 0.0 to 2.0 mol %, from 0.0 to 1.5 mol %, or from 0.1 mol % to 2.5 mol %, from 0.2 mol % to 2.0 mol % or from 0.5 mol % to 1.5 mol %. The proportion of $Al_2O_3$ may, for example, be at least 0.1 mol %, at least 0.2 mol % or at least 0.5 mol %. The proportion of $Al_2O_3$ may, for example, be at most 3.0 mol %, at most 2.5 mol %, at most 2.0 mol % or at most 1.5 mol %, at most 1.2 mol %, at most 1.0 mol %, at most 0.5 mol % or at most 0.2 mol %. Optionally, the glass is free of $Al_2O_3$.

Besides other components, an addition of CaO may increase the entropy in the glass system and therefore contribute to the glass formation. Optionally, the proportion of CaO lies in a range of from 0.0 mol % to 1.5 mol %, from 0.0 mol % to 1.2 mol %, from 0.0 mol % to 1.0 mol %, from 0.0 mol % to 0.8 mol %, or from 0.1 mol % to 1.2 mol %, from 0.2 mol % to 1.0 mol % or from 0.5 mol % to 0.8 mol %. The proportion of CaO may, for example, be at least 0.1 mol %, at least 0.2 mol % or at least 0.5 mol %. The proportion of CaO may, for example, be at most 1.5 mol %, at most 1.2 mol %, at most 1.0 mol % or at most 0.8 mol %, at most 0.5 mol % or at most 0.2 mol %. Optionally, the glass is free of CaO.

Besides other components, an addition of SrO may increase the entropy in the glass system and therefore contribute to the glass formation. Optionally, the proportion of SrO lies in a range of from 0.0 mol % to 1.5 mol %, from 0.0 mol % to 1.2 mol %, from 0.0 mol % to 1.0 mol %, from 0.0 mol % to 0.8 mol %, or from 0.1 mol % to 1.2 mol %, from 0.2 mol % to 1.0 mol % or from 0.5 mol % to 0.8 mol %. The proportion of SrO may, for example, be at least 0.1 mol %, at least 0.2 mol % or at least 0.5 mol %. The proportion of SrO may, for example, be at most 1.5 mol %, at most 1.2 mol %, at most 1.0 mol % or at most 0.8 mol %, at most 0.5 mol % or at most 0.2 mol %. Optionally, the glass is free of SrO.

Besides other components, an addition of $K_2O$ may increase the entropy in the glass system and therefore contribute to the glass formation. Optionally, the proportion of $K_2O$ lies in a range of from 0.0 mol % to 1.5 mol %, from 0.0 mol % to 1.2 mol %, from 0.0 mol % to 1.0 mol %, from 0.0 mol % to 0.5 mol %, or from 0.1 mol % to 1.0 mol %, or from 0.2 mol % to 0.5 mol %. The proportion of $K_2O$ may, for example, be at least 0.1 mol % or at least 0.2 mol %. The proportion of $K_2O$ may, for example, be at most 1.5 mol %, at most 1.2 mol %, at most 1.0 mol % or at most 0.8 mol %, at most 0.5 mol % or at most 0.2 mol %. Optionally, the glass is free of $K_2O$.

Optionally, the proportion of $Ta_2O_5$ lies in a range of from 0.0 mol % to 1.5 mol %, from 0.0 mol % to 1.2 mol %, from 0.0 mol % to 1.0 mol %, from 0.0 mol % to 0.5 mol %, from 0.1 mol % to 1.0 mol %, or from 0.2 mol % to 0.5 mol %. The proportion of $Ta_2O_5$ may, for example, be at least 0.1 mol % or at least 0.2 mol %. The proportion of $Ta_2O_5$ may, for example, be at most 1.5 mol %, at most 1.2 mol %, at most 1.0 mol % or at most 0.8 mol %, at most 0.5 mol % or at most 0.2 mol %. Optionally, the glass is free of $Ta_2O_5$.

$Yb_2O_3$ is one of the components with which the band edge $\lambda_{max}$ may be kept particularly low and a particularly high R-number may be achieved. Optionally, the proportion of $Yb_2O_3$ lies in a range of from 0.0 mol % to 1.5 mol %, from 0.0 mol % to 1.2 mol %, from 0.0 mol % to 1.0 mol %, from 0.0 mol % to 0.5 mol %, or from 0.1 mol % to 1.0 mol %, or from 0.2 mol % to 0.5 mol %. The proportion of $Yb_2O_3$ may, for example, be at least 0.1 mol % or at least 0.2 mol %. The proportion of $Yb_2O_3$ may, for example, be at most 1.5 mol %, at most 1.2 mol %, at most 1.0 mol % or at most 0.8 mol %, at most 0.5 mol % or at most 0.2 mol %. Optionally, the glass is free of $Yb_2O_3$.

$Lu_2O_3$ is one of the components with which the band edge $\lambda_{max}$ may be kept particularly low and a particularly high R-number may be achieved. Optionally, the proportion of $Lu_2O_3$ lies in a range of from 0.0 mol % to 5.0 mol %, from 0.0 mol % to 4.0 mol %, from 0.0 mol % to 3.0 mol %, from 0.0 mol % to 2.0 mol %, or from 0.1 mol % to 4.0 mol %, from 0.2 mol % to 3.0 mol % or from 0.5 mol % to 2.0 mol %. The proportion of $Lu_2O_3$ may, for example, be at least 0.1 mol %, at least 0.2 mol % or at least 0.5 mol %. The proportion of $Lu_2O_3$ may, for example, be at most 5.0 mol %, at most 4.0 mol %, at most 3.0 mol % or at most 2.0 mol %, at most 1.5 mol %, at most 1.0 mol %, at most 0.5 mol % or at most 0.2 mol %. Optionally, the glass is free of $Lu_2O_3$.

The deliberate adjustment of the sum of the proportions of $La_2O_3$, $Y_2O_3$, $Gd_2O_3$, $Yb_2O_3$ and $Lu_2O_3$ has proven advantageous. Optionally, the sum of the proportions of $La_2O_3$, $Y_2O_3$, $Gd_2O_3$, $Yb_2O_3$ and $Lu_2O_3$ lies in a range of from 12.5 mol % to 20.0 mol %, from 13.5 mol % to 19.0 mol %, from 14.0 mol % to 18.0 mol %, or from 14.5 mol % to 17.5 mol %. The sum of the proportions of $La_2O_3$, $Y_2O_3$, $Gd_2O_3$, $Yb_2O_3$ and $Lu_2O_3$ is optionally at least 12.5 mol %, at least 13.5 mol %, at least 14.0 mol %, or at least 14.5 mol %. The sum of the proportions of $La_2O_3$, $Y_2O_3$, $Gd_2O_3$, $Yb_2O_3$ and $Lu_2O_3$ is optionally at most 20.0 mol %, at most 19.0 mol %, at most 18.0 mol %, or at most 17.5 mol %.

It has furthermore proven advantageous for the sum of the proportions of $SiO_2$ and $B_2O_3$ to correspond approximately to the sum of the proportions of $La_2O_3$, $Y_2O_3$, $Gd_2O_3$, $Yb_2O_3$ and $Lu_2O_3$. The ratio of the sum of the proportions of $SiO_2$ and $B_2O_3$ (in mol %) to the sum of the proportions of $La_2O_3$, $Y_2O_3$, $Gd_2O_3$, $Yb_2O_3$ and $Lu_2O_3$ (in mol %) optionally lies in a range of from 0.5:1 to 1.3:1, or from 0.5:1 to 1.2:1, in a range of from 0.6:1 to 1.1:1, from 0.7:1 to 1.1:1, from 0.8:1 to 1.1:1 or from 0.9:1 to 1.1:1. The ratio of the sum of the proportions of $SiO_2$ and $B_2O_3$ (in mol %) to the sum of the proportions of $La_2O_3$, $Y_2O_3$, $Gd_2O_3$, $Yb_2O_3$ and $Lu_2O_3$ (in mol %) may, for example, be at least 0.5:1, at least 0.6:1, at least 0.7:1, at least 0.8:1 or at least 0.9:1. The ratio of the sum of the proportions of $SiO_2$ and $B_2O_3$ (in mol %) to the sum of the proportions of $La_2O_3$, $Y_2O_3$, $Gd_2O_3$, $Yb_2O_3$ and $Lu_2O_3$ (in mol %) may, for example, be at most 1.3:1, at most 1.2:1 or at most 1.1:1. In some embodiments, the ratio of the sum of the proportions of $SiO_2$ and $B_2O_3$ (in mol %) to the sum of the proportions of $La_2O_3$, $Y_2O_3$, $Gd_2O_3$, $Yb_2O_3$ and $Lu_2O_3$ (in mol %) is about 1:1, for example from 0.95:1 to 1.05:1. The ratio of the sum of the proportions of $SiO_2$ and $B_2O_3$ (in mol %) to the sum of the proportions of $La_2O_3$, $Y_2O_3$, $Gd_2O_3$, $Yb_2O_3$ and $Lu_2O_3$ (in mol %) may, for example, be at least 0.95:1 and/or at most 1.05:1.

When it is mentioned in this description that the glasses are free of a component or do not contain a certain component, it means that this component may be present in the glasses at most as an impurity. This means that it is not added in substantial amounts. Unsubstantial amounts are, according to the invention, amounts of less than 1000 ppm (molar), or less than 300 ppm (molar), optionally less than 100 ppm (molar), less than 50 ppm (molar) and less than 10 ppm (molar) or less than 5 ppm (molar).

The glasses are optionally free of components which are not disclosed as glass components in the present disclosure, or contain such components in a total proportion of at most 3.0 mol %, at most 2.0 mol %, at most 1.0 mol %, at most 0.5 mol % or at most 0.2 mol %. In some embodiments, the glasses are free of $Fe_2O_3$, $Li_2O$, $Na_2O$, $MgO$ and/or $Pt$.

The glass article may comprise a glass or consist of a glass which comprises or consists of the following components in the proportions specified (in mol %):

| Component | Proportion (mol %) |
| --- | --- |
| $SiO_2$ | 1.0-16.5 |
| $B_2O_3$ | 0.0-13.5 |
| $Al_2O_3$ | 0.0-3.0 |
| $BaO$ | 1.0-20.0 |
| $ZnO$ | 0.0-5.0 |
| $La_2O_3$ | 5.0-20.0 |
| $TiO_2$ | 28.0-65.0 |
| $Nb_2O_5$ | 0.1-20.0 |
| $Gd_2O_3$ | 0.0-8.0 |
| $WO_3$ | 0.0-5.0 |
| $Y_2O_3$ | 0.0-5.0 |
| $ZrO_2$ | 1.0-11.0 |
| $\Sigma\ LaO_3 + Y_2O_3 + Gd_2O_3 + Yb_2O_3 + Lu_2O_3$ | 12.5-20.0 |

The glass article may comprise a glass or consist of a glass which comprises or consists of the following components in the proportions specified (in mol %):

| Component | Proportion (mol %) |
| --- | --- |
| $SiO_2$ | 1.0-16.5 |
| $B_2O_3$ | 0.0-13.5 |
| $Al_2O_3$ | 0.0-3.0 |
| $BaO$ | 1.0-20.0 |
| $ZnO$ | 0.0-5.0 |
| $La_2O_3$ | 5.0-20.0 |
| $TiO_2$ | 28.0-65.0 |
| $Nb_2O_5$ | 0.1-20.0 |
| $Gd_2O_3$ | 0.0-8.0 |
| $WO_3$ | 0.0-5.0 |
| $Y_2O_3$ | 0.0-5.0 |
| $ZrO_2$ | 1.0-11.0 |
| $K_2O$ | 0.0-1.5 |
| $CaO$ | 0.0-1.5 |
| $SrO$ | 0.0-1.5 |
| $Ta_2O_5$ | 0.0-1.5 |
| $Yb_2O_3$ | 0.0-1.5 |
| $Lu_2O_3$ | 0.0-5.0 |
| $\Sigma\ SiO_2 + B_2O_3$ | 3.5-25.0 |
| $\Sigma\ La_2O_3 + Y_2O_3 + Gd_2O_3 + Yb_2O_3 + Lu_2O_3$ | 12.5-20.0 |

The glass article may comprise a glass or consist of a glass which comprises or consists of the following components in the proportions specified (in mol %):

| Component | Proportion (mol %) |
| --- | --- |
| $SiO_2$ | 1.5-16.0 |
| $B_2O_3$ | 0.5-13.0 |
| $Al_2O_3$ | 0.0-2.5 |
| $BaO$ | 2.0-18.0 |
| $ZnO$ | 0.0-4.0 |

-continued

| Component | Proportion (mol %) |
|---|---|
| $La_2O_3$ | 7.0-18.0 |
| $TiO_2$ | 30.0-62.5 |
| $Nb_2O_5$ | 0.5-18.0 |
| $Gd_2O_3$ | 0.0-7.0 |
| $WO_3$ | 0.0-4.0 |
| $Y_2O_3$ | 0.0-4.0 |
| $ZrO_2$ | 2.0-10.0 |
| $K_2O$ | 0.0-1.2 |
| $CaO$ | 0.0-1.2 |
| $SrO$ | 0.0-1.2 |
| $Ta_2O_5$ | 0.0-1.2 |
| $Yb_2O_3$ | 0.0-1.2 |
| $Lu_2O_3$ | 0.0-4.0 |
| $\Sigma SiO_2 + B_2O_3$ | 5.0-22.5 |
| $\Sigma LaO_3 + Y_2O_3 + Gd_2O_3 + Yb_2O_3 + Lu_2O_3$ | 13.5-19.0 |

The glass article may comprise a glass or consist of a glass which comprises or consists of the following components in the proportions specified (in mol %):

| Component | Proportion (mol %) |
|---|---|
| $SiO_2$ | 1.5-16.0 |
| $B_2O_3$ | 0.5-13.0 |
| $Al_2O_3$ | 0.0-2.5 |
| $BaO$ | 2.0-18.0 |
| $ZnO$ | 0.0-4.0 |
| $La_2O_3$ | 7.0-18.0 |
| $TiO_2$ | 30.0-62.5 |
| $Nb_2O_5$ | 0.5-18.0 |
| $Gd_2O_3$ | 0.0-7.0 |
| $WO_3$ | 0.0-4.0 |
| $Y_2O_3$ | 0.0-4.0 |
| $ZrO_2$ | 2.0-10.0 |
| $\Sigma La_2O_3 + Y_2O_3 + Gd_2O_3 + Yb_2O_3 + Lu_2O_3$ | 13.5-19.0 |

The glass article may comprise a glass or consist of a glass which comprises or consists of the following components in the proportions specified (in mol %):

| Component | Proportion (mol %) |
|---|---|
| $SiO_2$ | 2.5-15.5 |
| $B_2O_3$ | 1.0-12.5 |
| $Al_2O_3$ | 0.0-2.0 |
| $BaO$ | 3.0-17.0 |
| $ZnO$ | 0.0-3.0 |
| $La_2O_3$ | 8.0-17.0 |
| $TiO_2$ | 32.0-60.0 |
| $Nb_2O_5$ | 1.0-17.0 |
| $Gd_2O_3$ | 0.0-6.0 |
| $WO_3$ | 0.0-3.0 |
| $Y_2O_3$ | 0.0-3.0 |
| $ZrO_2$ | 3.0-9.5 |
| $\Sigma La_2O_3 + Y_2O_3 + Gd_2O_3 + Yb_2O_3 + Lu_2O_3$ | 14.0-18.0 |

The glass article may comprise a glass or consist of a glass which comprises or consists of the following components in the proportions specified (in mol %):

| Component | Proportion (mol %) |
|---|---|
| $SiO_2$ | 2.5-15.5 |
| $B_2O_3$ | 1.0-12.5 |
| $Al_2O_3$ | 0.0-2.0 |
| $BaO$ | 3.0-17.0 |

-continued

| Component | Proportion (mol %) |
|---|---|
| $ZnO$ | 0.0-3.0 |
| $La_2O_3$ | 8.0-17.0 |
| $TiO_2$ | 32.0-60.0 |
| $Nb_2O_5$ | 1.0-17.0 |
| $Gd_2O_3$ | 0.0-6.0 |
| $WO_3$ | 0.0-3.0 |
| $Y_2O_3$ | 0.0-3.0 |
| $ZrO_2$ | 3.0-9.5 |
| $\Sigma SiO_2 + B_2O_3$ | 3.5-25.0 |
| $\Sigma La_2O_3 + Y_2O_3 + Gd_2O_3 + Yb_2O_3 + Lu_2O_3$ | 14.0-18.0 |

The glass article may comprise a glass or consist of a glass which comprises or consists of the following components in the proportions specified (in mol %):

| Component | Proportion (mol %) |
|---|---|
| $SiO_2$ | 2.5-15.5 |
| $B_2O_3$ | 1.0-12.5 |
| $Al_2O_3$ | 0.0-2.0 |
| $BaO$ | 3.0-17.0 |
| $ZnO$ | 0.0-3.0 |
| $La_2O_3$ | 8.0-17.0 |
| $TiO_2$ | 32.0-60.0 |
| $Nb_2O_5$ | 1.0-17.0 |
| $Gd_2O_3$ | 0.0-6.0 |
| $WO_3$ | 0.0-3.0 |
| $Y_2O_3$ | 0.0-3.0 |
| $ZrO_2$ | 3.0-9.5 |
| $K_2O$ | 0.0-1.0 |
| $CaO$ | 0.0-1.0 |
| $SrO$ | 0.0-1.0 |
| $Ta_2O_5$ | 0.0-1.0 |
| $Yb_2O_3$ | 0.0-1.0 |
| $Lu_2O_3$ | 0.0-3.0 |
| $\Sigma La_2O_3 + Y_2O_3 + Gd_2O_3 + Yb_2O_3 + Lu_2O_3$ | 14.0-18.0 |

The glass article may comprise a glass or consist of a glass which comprises or consists of the following components in the proportions specified (in mol %):

| Component | Proportion (mol %) |
|---|---|
| $SiO_2$ | 2.5-15.5 |
| $B_2O_3$ | 1.0-12.5 |
| $Al_2O_3$ | 0.0-2.0 |
| $BaO$ | 3.0-17.0 |
| $ZnO$ | 0.0-3.0 |
| $La_2O_3$ | 8.0-17.0 |
| $TiO_2$ | 32.0-60.0 |
| $Nb_2O_5$ | 1.0-17.0 |
| $Gd_2O_3$ | 0.0-6.0 |
| $WO_3$ | 0.0-3.0 |
| $Y_2O_3$ | 0.0-3.0 |
| $ZrO_2$ | 3.0-9.5 |
| $K_2O$ | 0.0-1.0 |
| $CaO$ | 0.0-1.0 |
| $SrO$ | 0.0-1.0 |
| $Ta_2O_5$ | 0.0-1.0 |
| $Yb_2O_3$ | 0.0-1.0 |
| $Lu_2O_3$ | 0.0-3.0 |
| $\Sigma SiO_2 + B_2O_3$ | 3.5-25.0 |
| $\Sigma La_2O_3 + Y_2O_3 + Gd_2O_3 + Yb_2O_3 + Lu_2O_3$ | 14.0-18.0 |

The glass article may comprise a glass or consist of a glass which comprises or consists of the following components in the proportions specified (in mol %):

13

| Component | Proportion (mol %) |
|---|---|
| $SiO_2$ | 3.0-15.0 |
| $B_2O_3$ | 1.5-12.0 |
| $Al_2O_3$ | 0.0-1.5 |
| BaO | 4.0-16.0 |
| ZnO | 0.0-2.0 |
| $La_2O_3$ | 8.5-16.0 |
| $TiO_2$ | 34.0-59.0 |
| $Nb_2O_5$ | 2.0-16.0 |
| $Gd_2O_3$ | 0.0-5.0 |
| $WO_3$ | 0.0-2.0 |
| $Y_2O_3$ | 0.0-2.0 |
| $ZrO_2$ | 4.0-9.0 |
| $K_2O$ | 0.0-0.5 |
| CaO | 0.0-0.8 |
| SrO | 0.0-0.8 |
| $Ta_2O_5$ | 0.0-0.5 |
| $Yb_2O_3$ | 0.0-0.5 |
| $Lu_2O_3$ | 0.0-2.0 |

The glass article provided according to the invention may, for example, have a refractive index $n_G$ of at least 1.95, at least 1.96, at least 1.97, at least 1.98, at least 1.99, at least 2.00, at least 2.01, at least 2.02, at least 2.03, at least 2.04, or at least 2.05, at least 2.06, at least 2.07, at least 2.08, at least 2.09, or at least 2.10, at least 2.11 or at least 2.12. The glass article provided according to the invention may, for example, have a refractive index $n_G$ of at most 2.25, at most 2.24, at most 2.23, at most 2.22, at most 2.21, at most 2.20, at most 2.19, at most 2.18, at most 2.17, at most 2.16, or at most 2.15. The glass article provided according to the invention may, for example, have a refractive index $n_G$ in a range of from 1.95 to 2.25, from 1.96 to 2.24, from 1.97 to 2.23, from 1.98 to 2.22, from 1.99 to 2.21, from 2.00 to 2.20, from 2.01 to 2.19, from 2.02 to 2.18, from 2.03 to 2.17, from 2.04 to 2.16, or from 2.05 to 2.16, or from 2.12 to 2.16, from 2.12 to 2.15. The refractive index $n_G$ may lie in a range of from 2.06 to 2.25, from 2.07 to 2.24, from 2.08 to 2.23, from 2.09 to 2.22, from 2.10 to 2.21, from 2.11 to 2.20 or from 2.12 to 2.19.

The glass article provided according to the invention may, for example, have a thickness in a range of from 0.05 to 3.0 mm, from 0.1 to 2.75 mm, from 0.15 to 2.5 mm, from 0.2 to 2.25 mm, from 0.25 to 2.0 mm, from 0.3 to 1.8 mm, from 0.35 to 1.5 mm, from 0.4 to 1.0 mm or from 0.5 to 0.8 mm. The thickness of the glass article may, for example, be at least 0.05 mm, at least 0.1 mm, at least 0.15 mm, at least 0.2 mm, at least 0.25 mm, at least 0.3 mm, at least 0.35 mm, at least 0.4 mm or at least 0.5 mm. The thickness of the glass article may, for example, be at most 3.0 mm, at most 2.0 mm, at most 1.8 mm, at most 1.5 mm, at most 1.0 mm or at most 0.8 mm. The glass article may be a wafer, a plate, a pane or a spectacle lens or a part thereof.

The glass article may, for example, have a surface roughness (quadratic roughness ($R_q$ or else RMS)) of at most 5 nm, at most 3 nm, at most 1 nm, <1 nm, <0.5 nm or <0.1 nm. The roughness depth $R_t$ is optionally at most 6 nm, at most 4 nm or at most 2 nm, for example at most 1 nm, at most 0.5 nm or at most 0.1 nm. The roughness depth and/or the quadratic roughness are optionally determined according to DIN EN ISO 4287, in particular according to DIN EN ISO 4287:2010-07. The roughness depth and/or the quadratic roughness may, for example, be determined with an atomic force microscope (AFM). The test area may, for example, be $2 \times 2$ $\mu m^2$ or $10 \times 10$ $\mu m^2$.

The glass article may, for example, have a Knoop hardness of >600, optionally >630, or >650. The Knoop hardness may, for example, be at most 900, at most 850 or at most 820. The Knoop hardness may for example lie in a range of from >600 to 900, from >630 to 850 or from >650 to 820.

The production of a glass article according to the present invention may be carried out by a method comprising shaping with defined cooling rates.

The present invention also relates to the use of a glass article provided according to the invention as a wafer for augmented reality applications, in smartphone cameras and/or as a waveguide coupler.

Examples

The compositions of exemplary glasses provided according to the invention are shown in the following tables (in mol %). The refractive index $n_G$ and the R-number are likewise shown.

| Ex. No | $Al_2O_3$ | $B_2O_3$ | BaO | CaO | $Gd_2O_3$ | $K_2O$ | $La_2O_3$ | $Nb_2O_5$ | $SiO_2$ | SrO | $TiO_2$ | $Y_2O_3$ | ZnO | $ZrO_2$ | $WO_3$ | $Ta_2O_5$ | $n_G$ | R |
|---|---|---|---|---|---|---|---|---|---|---|---|---|---|---|---|---|---|---|
| 1 | 0.0 | 7.6 | 4.8 | 0.0 | 2.1 | 0.0 | 14.8 | 4.1 | 6.1 | 0.0 | 54.9 | 0.0 | 0.0 | 5.5 | 0.0 | 0.0 | 2.1612 | 0.980 |
| 2 | 0.0 | 7.6 | 6.3 | 0.0 | 2.0 | 0.0 | 14.0 | 4.1 | 6.1 | 0.0 | 54.5 | 0.0 | 0.0 | 5.5 | 0.0 | 0.0 | 2.1556 | 0.976 |
| 3 | 0.0 | 7.6 | 6.3 | 0.0 | 4.0 | 0.0 | 12.0 | 4.1 | 6.1 | 0.0 | 54.5 | 0.0 | 0.0 | 5.5 | 0.0 | 0.0 | 2.1533 | 0.968 |
| 4 | 0.0 | 11.4 | 6.4 | 0.0 | 2.0 | 0.0 | 13.8 | 3.9 | 4.8 | 0.0 | 52.5 | 0.0 | 0.0 | 5.2 | 0.0 | 0.0 | 2.1349 | 0.968 |
| 5 | 0.0 | 9.0 | 6.4 | 0.0 | 2.0 | 0.0 | 13.8 | 3.9 | 7.2 | 0.0 | 52.5 | 0.0 | 0.0 | 5.2 | 0.0 | 0.0 | 2.1369 | 0.970 |
| 6 | 0.0 | 6.6 | 6.4 | 0.0 | 2.0 | 0.0 | 13.8 | 3.9 | 9.6 | 0.0 | 52.5 | 0.0 | 0.0 | 5.2 | 0.0 | 0.0 | 2.1390 | 0.972 |
| 7 | 0.0 | 4.2 | 6.4 | 0.0 | 2.0 | 0.0 | 13.8 | 3.9 | 12.0 | 0.0 | 52.5 | 0.0 | 0.0 | 5.2 | 0.0 | 0.0 | 2.1410 | 0.974 |
| 8 | 0.0 | 1.8 | 6.4 | 0.0 | 2.0 | 0.0 | 13.8 | 3.9 | 14.4 | 0.0 | 52.5 | 0.0 | 0.0 | 5.2 | 0.0 | 0.0 | 2.1431 | 0.976 |
| 9 | 0.0 | 6.6 | 6.2 | 0.0 | 1.9 | 0.0 | 13.3 | 4.0 | 9.5 | 0.0 | 53.2 | 0.0 | 0.0 | 5.3 | 0.0 | 0.0 | 2.1428 | 0.968 |
| 10 | 0.0 | 6.6 | 6.5 | 0.0 | 2.0 | 0.0 | 13.9 | 3.9 | 9.6 | 0.0 | 52.2 | 0.0 | 0.0 | 5.2 | 0.0 | 0.0 | 2.1378 | 0.973 |
| 11 | 0.4 | 6.6 | 6.5 | 0.0 | 2.0 | 0.0 | 14.0 | 3.9 | 8.9 | 0.0 | 52.4 | 0.0 | 0.0 | 5.2 | 0.0 | 0.0 | 2.1375 | 0.973 |
| 12 | 0.0 | 6.6 | 5.9 | 0.0 | 2.0 | 0.0 | 13.9 | 3.9 | 9.6 | 0.7 | 52.2 | 0.0 | 0.0 | 5.2 | 0.0 | 0.0 | 2.1364 | 0.971 |
| 13 | 0.0 | 6.6 | 5.9 | 0.7 | 2.0 | 0.0 | 13.9 | 3.9 | 9.6 | 0.0 | 52.2 | 0.0 | 0.0 | 5.2 | 0.0 | 0.0 | 2.1395 | 0.972 |
| 14 | 0.0 | 6.6 | 6.5 | 0.0 | 2.0 | 0.0 | 13.3 | 3.9 | 9.6 | 0.0 | 52.2 | 0.6 | 0.0 | 5.2 | 0.0 | 0.0 | 2.1388 | 0.973 |
| 15 | 0.0 | 6.6 | 6.5 | 0.0 | 2.0 | 0.0 | 13.9 | 3.9 | 9.6 | 0.0 | 50.9 | 0.0 | 1.3 | 5.2 | 0.0 | 0.0 | 2.1328 | 0.974 |
| 16 | 0.0 | 6.8 | 6.7 | 0.0 | 2.0 | 0.0 | 14.3 | 6.7 | 9.8 | 0.0 | 48.3 | 0.0 | 0.0 | 5.4 | 0.0 | 0.0 | 2.1345 | 0.976 |
| 17 | 0.0 | 6.6 | 6.5 | 0.0 | 2.0 | 0.0 | 13.9 | 3.9 | 9.6 | 0.0 | 49.0 | 0.0 | 0.0 | 8.5 | 0.0 | 0.0 | 2.1293 | 0.981 |
| 18 | 0.0 | 6.6 | 6.5 | 0.0 | 2.0 | 0.0 | 13.3 | 3.9 | 9.6 | 0.0 | 50.9 | 0.6 | 1.3 | 5.2 | 0.0 | 0.0 | 2.1338 | 0.974 |
| 19 | 0.0 | 4.2 | 6.5 | 0.0 | 2.0 | 0.0 | 13.3 | 3.9 | 12.0 | 0.0 | 50.9 | 0.6 | 1.3 | 5.2 | 0.0 | 0.0 | 2.1358 | 0.976 |
| 20 | 0.0 | 6.6 | 6.6 | 0.0 | 2.0 | 0.0 | 13.4 | 3.9 | 9.6 | 0.0 | 52.1 | 0.6 | 0.0 | 5.2 | 0.0 | 0.0 | 2.1380 | 0.973 |
| 21 | 0.0 | 6.6 | 6.5 | 0.0 | 2.0 | 0.0 | 13.3 | 3.9 | 9.6 | 0.0 | 51.6 | 0.6 | 0.7 | 5.2 | 0.0 | 0.0 | 2.1363 | 0.973 |
| 22 | 0.0 | 6.6 | 6.6 | 0.0 | 2.0 | 0.0 | 13.4 | 3.9 | 9.6 | 0.0 | 51.4 | 0.6 | 0.7 | 5.2 | 0.0 | 0.0 | 2.1355 | 0.974 |
| 23 | 0.0 | 6.0 | 6.7 | 0.0 | 2.0 | 0.0 | 13.9 | 4.1 | 7.2 | 0.0 | 54.2 | 0.5 | 0.0 | 5.4 | 0.0 | 0.0 | 2.1566 | 0.980 |
| 24 | 0.0 | 6.0 | 6.6 | 0.0 | 2.0 | 0.0 | 13.6 | 4.1 | 7.2 | 0.0 | 54.5 | 0.5 | 0.0 | 5.5 | 0.0 | 0.0 | 2.1585 | 0.979 |
| 25 | 0.0 | 6.0 | 6.5 | 0.0 | 2.0 | 0.0 | 13.4 | 4.1 | 7.2 | 0.0 | 54.9 | 0.5 | 0.0 | 5.5 | 0.0 | 0.0 | 2.1604 | 0.977 |

-continued

| Ex. No | Al$_2$O$_3$ | B$_2$O$_3$ | BaO | CaO | Gd$_2$O$_3$ | K$_2$O | La$_2$O$_3$ | Nb$_2$O$_5$ | SiO$_2$ | SrO | TiO$_2$ | Y$_2$O$_3$ | ZnO | ZrO$_2$ | WO$_3$ | Ta$_2$O$_5$ | n$_G$ | R |
|---|---|---|---|---|---|---|---|---|---|---|---|---|---|---|---|---|---|---|
| 26 | 0.0 | 6.0 | 6.4 | 0.0 | 1.9 | 0.0 | 13.1 | 4.1 | 7.2 | 0.0 | 55.2 | 0.5 | 0.0 | 5.5 | 0.0 | 0.0 | 2.1622 | 0.975 |
| 27 | 0.0 | 4.6 | 6.7 | 0.0 | 2.1 | 0.0 | 13.9 | 4.3 | 5.6 | 0.0 | 56.7 | 0.5 | 0.0 | 5.7 | 0.0 | 0.0 | 2.1785 | 0.986 |
| 28 | 0.0 | 4.6 | 6.6 | 0.0 | 2.0 | 0.0 | 13.6 | 4.3 | 5.6 | 0.0 | 57.0 | 0.5 | 0.0 | 5.7 | 0.0 | 0.0 | 2.1810 | 0.985 |
| 29 | 0.0 | 4.6 | 6.5 | 0.0 | 2.0 | 0.0 | 13.4 | 4.3 | 5.6 | 0.0 | 57.4 | 0.5 | 0.0 | 5.7 | 0.0 | 0.0 | 2.1822 | 0.982 |
| 30 | 0.0 | 4.6 | 6.4 | 0.0 | 1.9 | 0.0 | 13.2 | 4.3 | 5.6 | 0.0 | 57.7 | 0.5 | 0.0 | 5.8 | 0.0 | 0.0 | 2.1840 | 0.980 |
| 31 | 0.0 | 6.6 | 6.5 | 0.0 | 2.0 | 0.0 | 13.4 | 3.9 | 9.6 | 0.0 | 51.6 | 0.5 | 0.7 | 5.2 | 0.0 | 0.0 | 2.1359 | 0.973 |
| 32 | 0.0 | 6.6 | 6.6 | 0.0 | 2.0 | 0.0 | 13.5 | 3.9 | 9.6 | 0.0 | 51.4 | 0.5 | 0.7 | 5.2 | 0.0 | 0.0 | 2.1352 | 0.974 |
| 33 | 0.0 | 6.6 | 6.4 | 0.0 | 2.0 | 0.0 | 13.3 | 3.9 | 9.6 | 0.0 | 51.8 | 0.5 | 0.7 | 5.2 | 0.0 | 0.0 | 2.1371 | 0.972 |
| 34 | 0.0 | 6.6 | 6.5 | 0.0 | 2.0 | 0.0 | 13.4 | 3.9 | 9.6 | 0.0 | 51.6 | 0.5 | 0.7 | 5.2 | 0.0 | 0.0 | 2.1360 | 0.973 |
| 35 | 0.0 | 6.6 | 6.5 | 0.0 | 2.0 | 0.0 | 13.4 | 3.9 | 9.6 | 0.0 | 50.9 | 0.5 | 0.7 | 5.2 | 0.7 | 0.0 | 2.1350 | 0.971 |
| 36 | 0.0 | 6.6 | 5.9 | 0.0 | 2.0 | 0.0 | 13.4 | 3.9 | 9.6 | 0.7 | 51.6 | 0.5 | 0.7 | 5.2 | 0.0 | 0.0 | 2.1346 | 0.971 |
| 37 | 0.0 | 6.6 | 5.9 | 0.7 | 2.0 | 0.0 | 13.4 | 3.9 | 9.6 | 0.0 | 51.6 | 0.5 | 0.7 | 5.2 | 0.0 | 0.0 | 2.1377 | 0.973 |
| 38 | 0.0 | 6.6 | 5.9 | 0.0 | 2.0 | 0.3 | 13.5 | 3.9 | 9.6 | 0.0 | 51.8 | 0.5 | 0.7 | 5.2 | 0.0 | 0.0 | 2.1350 | 0.972 |
| 39 | 0.0 | 6.6 | 6.5 | 0.0 | 2.0 | 0.0 | 13.5 | 3.9 | 9.6 | 0.0 | 51.1 | 0.5 | 0.7 | 5.2 | 0.0 | 0.3 | 2.1360 | 0.973 |
| 40 | 0.0 | 6.0 | 6.5 | 0.0 | 2.0 | 0.0 | 13.4 | 3.9 | 10.2 | 0.0 | 51.6 | 0.5 | 0.7 | 5.2 | 0.0 | 0.0 | 2.1366 | 0.974 |
| 41 | 0.0 | 7.2 | 6.5 | 0.0 | 2.0 | 0.0 | 13.4 | 3.9 | 9.0 | 0.0 | 51.6 | 0.5 | 0.7 | 5.2 | 0.0 | 0.0 | 2.1355 | 0.973 |
| 42 | 0.0 | 7.2 | 6.7 | 0.0 | 2.0 | 0.0 | 13.9 | 4.1 | 6.0 | 0.0 | 54.2 | 0.5 | 0.0 | 5.4 | 0.0 | 0.0 | 2.1556 | 0.979 |
| 43 | 0.0 | 7.2 | 6.6 | 0.0 | 2.0 | 0.0 | 13.6 | 4.1 | 6.0 | 0.0 | 54.5 | 0.5 | 0.0 | 5.5 | 0.0 | 0.0 | 2.1575 | 0.978 |
| 44 | 0.0 | 4.8 | 6.6 | 0.0 | 2.0 | 0.0 | 13.6 | 4.1 | 8.4 | 0.0 | 54.5 | 0.5 | 0.0 | 5.5 | 0.0 | 0.0 | 2.1595 | 0.980 |
| 45 | 0.0 | 6.1 | 6.6 | 0.0 | 2.2 | 0.0 | 14.6 | 3.9 | 9.7 | 0.0 | 50.7 | 0.5 | 0.6 | 5.1 | 0.0 | 0.0 | 2.1344 | 0.982 |
| 46 | 0.0 | 6.6 | 5.9 | 0.7 | 2.0 | 0.0 | 13.5 | 3.9 | 9.6 | 0.0 | 50.4 | 0.5 | 0.7 | 5.2 | 0.7 | 0.3 | 2.1360 | 0.969 |
| 47 | 0.0 | 5.4 | 6.6 | 0.0 | 2.0 | 0.0 | 13.7 | 4.3 | 4.8 | 0.0 | 56.2 | 0.5 | 0.7 | 5.7 | 0.0 | 0.0 | 2.1766 | 0.984 |
| 48 | 0.0 | 5.4 | 6.5 | 0.0 | 2.0 | 0.0 | 13.4 | 4.3 | 4.8 | 0.0 | 56.6 | 0.5 | 0.7 | 5.7 | 0.0 | 0.0 | 2.1784 | 0.983 |
| 49 | 0.0 | 5.4 | 6.4 | 0.0 | 2.0 | 0.0 | 13.2 | 4.3 | 4.8 | 0.0 | 57.0 | 0.5 | 0.7 | 5.8 | 0.0 | 0.0 | 2.1802 | 0.981 |
| 50 | 0.0 | 5.4 | 6.3 | 0.0 | 1.9 | 0.0 | 13.0 | 4.4 | 4.8 | 0.0 | 57.3 | 0.5 | 0.7 | 5.8 | 0.0 | 0.0 | 2.1820 | 0.979 |
| 51 | 0.0 | 5.4 | 6.2 | 0.0 | 1.9 | 0.0 | 12.7 | 4.4 | 4.8 | 0.0 | 57.7 | 0.5 | 0.7 | 5.8 | 0.0 | 0.0 | 2.1838 | 0.977 |
| 52 | 0.0 | 6.6 | 6.3 | 0.0 | 1.9 | 0.0 | 13.0 | 4.0 | 9.6 | 0.0 | 52.2 | 0.5 | 0.7 | 5.3 | 0.0 | 0.0 | 2.1395 | 0.970 |
| 53 | 0.0 | 6.5 | 6.2 | 0.0 | 1.9 | 0.0 | 12.7 | 4.0 | 9.5 | 0.0 | 52.7 | 0.5 | 0.7 | 5.3 | 0.0 | 0.0 | 2.1421 | 0.968 |
| 54 | 0.0 | 6.6 | 6.5 | 0.0 | 2.0 | 0.0 | 13.4 | 3.9 | 9.6 | 0.0 | 51.7 | 0.5 | 0.7 | 5.2 | 0.0 | 0.0 | 2.1368 | 0.973 |
| 55 | 0.0 | 6.6 | 6.4 | 0.0 | 2.0 | 0.0 | 13.2 | 3.9 | 9.6 | 0.0 | 52.0 | 0.5 | 0.7 | 5.3 | 0.0 | 0.0 | 2.1379 | 0.972 |
| 56 | 0.0 | 6.6 | 6.3 | 0.0 | 1.9 | 0.0 | 13.1 | 4.0 | 9.6 | 0.0 | 52.2 | 0.5 | 0.7 | 5.3 | 0.0 | 0.0 | 2.1391 | 0.971 |
| 57 | 0.0 | 6.6 | 6.3 | 0.0 | 1.9 | 0.0 | 12.9 | 4.0 | 9.5 | 0.0 | 52.4 | 0.5 | 0.7 | 5.3 | 0.0 | 0.0 | 2.1402 | 0.970 |
| 58 | 0.0 | 5.5 | 6.3 | 0.0 | 1.9 | 0.0 | 13.1 | 4.3 | 5.0 | 0.0 | 56.9 | 0.5 | 0.7 | 5.8 | 0.0 | 0.0 | 2.1787 | 0.979 |
| 59 | 0.0 | 5.5 | 6.3 | 0.0 | 1.9 | 0.0 | 12.9 | 4.3 | 5.0 | 0.0 | 57.1 | 0.5 | 0.7 | 5.8 | 0.0 | 0.0 | 2.1798 | 0.978 |
| 60 | 0.0 | 5.5 | 6.2 | 0.0 | 1.9 | 0.0 | 12.8 | 4.4 | 5.0 | 0.0 | 57.3 | 0.5 | 0.7 | 5.8 | 0.0 | 0.0 | 2.1809 | 0.977 |
| 61 | 0.0 | 5.5 | 6.1 | 0.0 | 1.9 | 0.0 | 12.6 | 4.4 | 5.0 | 0.0 | 57.5 | 0.4 | 0.7 | 5.8 | 0.0 | 0.0 | 2.1820 | 0.976 |
| 62 | 0.0 | 6.6 | 6.4 | 0.0 | 2.0 | 0.0 | 13.2 | 3.9 | 9.6 | 0.0 | 52.0 | 0.5 | 0.7 | 5.3 | 0.0 | 0.0 | 2.1388 | 0.972 |
| 63 | 0.0 | 6.6 | 6.3 | 0.0 | 1.9 | 0.0 | 13.1 | 4.0 | 9.6 | 0.0 | 52.2 | 0.5 | 0.7 | 5.3 | 0.0 | 0.0 | 2.1389 | 0.971 |
| 64 | 0.0 | 5.5 | 6.2 | 0.0 | 1.9 | 0.0 | 12.9 | 4.3 | 5.0 | 0.0 | 57.2 | 0.5 | 0.7 | 5.8 | 0.0 | 0.0 | 2.1802 | 0.978 |
| 65 | 0.0 | 5.5 | 6.8 | 0.0 | 1.9 | 0.0 | 12.6 | 4.3 | 5.0 | 0.0 | 57.0 | 0.4 | 0.7 | 5.8 | 0.0 | 0.0 | 2.1780 | 0.976 |
| 66 | 0.0 | 6.9 | 6.2 | 0.0 | 1.9 | 0.0 | 12.9 | 4.3 | 3.6 | 0.0 | 57.2 | 0.5 | 0.7 | 5.8 | 0.0 | 0.0 | 2.1789 | 0.977 |
| 67 | 0.0 | 4.1 | 6.2 | 0.0 | 1.9 | 0.0 | 12.9 | 4.3 | 6.5 | 0.0 | 57.2 | 0.5 | 0.7 | 5.8 | 0.0 | 0.0 | 2.1814 | 0.979 |
| 68 | 0.0 | 6.8 | 6.7 | 0.0 | 2.1 | 0.0 | 13.9 | 7.4 | 9.9 | 0.0 | 46.6 | 0.5 | 0.7 | 5.4 | 0.0 | 0.0 | 2.1319 | 0.977 |
| 69 | 0.0 | 6.6 | 6.5 | 0.0 | 2.0 | 0.0 | 13.4 | 3.9 | 10.4 | 0.0 | 50.9 | 0.5 | 0.6 | 5.2 | 0.0 | 0.0 | 2.1302 | 0.972 |
| 70 | 0.0 | 6.5 | 6.5 | 0.0 | 2.0 | 0.0 | 13.4 | 3.2 | 9.5 | 0.0 | 51.3 | 0.5 | 0.6 | 5.2 | 1.3 | 0.0 | 2.1330 | 0.966 |
| 71 | 0.0 | 6.6 | 6.6 | 0.0 | 2.0 | 0.0 | 13.6 | 3.9 | 10.3 | 0.0 | 51.4 | 0.5 | 0.0 | 5.1 | 0.0 | 0.0 | 2.1316 | 0.981 |

The way in which the R-number according to the invention may be determined will be explained below by way of example with the aid of the exemplary glass 31.

The refractive index of the exemplary glass 31 was measured at three different wavelengths. The results are shown in the following table and in the sole FIGURE.

| $\lambda$ [nm] | Refractive index |
|---|---|
| 441 | 2.2040 |
| 639 | 2.1239 |
| 947 | 2.0896 |

By adaptation/fitting to Equation 1, the parameters $\lambda_{max}$ and c were ascertained in determined fashion by the method of least squares. With the refraction indices $n_i$ measured at the wavelengths $\lambda_i$, $\Sigma_i(n_i-n(\lambda_i))^2 \to 0$ was minimised, with according to Equation 1

$$n(\lambda) = c \cdot \ln\left[\frac{\lambda^2 - \lambda_{min}^2}{\lambda^2 - \lambda_{max}^2} \cdot \frac{\lambda_{max}^2}{\lambda_{min}^2}\right] + 1.$$

The parameter $\lambda_{min}$=33 nm was assumed to be constant. From the fit, $\lambda_{max}$=289.9 nm and c=0.25 were determined. The refractive index $n_G$ was 2.1359. The formula $$R = (n_G - 1)\left(\frac{\ln\left[\frac{\lambda_G^2 - \lambda_{min}^2}{\lambda_G^2 - \lambda_{max}^2} \cdot \frac{\lambda_{max}^2}{\lambda_{min}^2}\right]}{42 \ln\left[\frac{\lambda_B^2 - \lambda_{min}^2}{\lambda_B^2 - \lambda_{max}^2} \cdot \frac{\lambda_R^2 - \lambda_{max}^2}{\lambda_R^2 - \lambda_{min}^2}\right]} + \frac{1}{2.8}\right)$$

with $\lambda_R$=656 nm, $\lambda_G$=587 nm and $\lambda_B$=486 nm gives R=0.973.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A glass article having a refractive index $n_G \geq 2.05$ and an R-number in a range of from 0.900 to 1.050, wherein the R-number is calculated according to the following formula:

$$R = (n_G - 1)\left(\frac{\ln\left[\frac{\lambda_G^2 - \lambda_{min}^2}{\lambda_G^2 - \lambda_{max}^2} \cdot \frac{\lambda_{max}^2}{\lambda_{min}^2}\right]}{42 \ln\left[\frac{\lambda_B^2 - \lambda_{min}^2}{\lambda_B^2 - \lambda_{max}^2} \cdot \frac{\lambda_R^2 - \lambda_{max}^2}{\lambda_R^2 - \lambda_{min}^2}\right]} + \frac{1}{2.8}\right);$$

wherein $\lambda_R$=656 nm, $\lambda_G$=587 nm and $\lambda_B$=486 nm, wherein $\lambda_{min}$=33 nm, and wherein $n_G$ is a refractive index of the glass article at a wavelength of 587 nm, wherein the glass article comprises a glass that comprises $SiO_2$ and $B_2O_3$ and a sum of the proportions of $SiO_2$ and $B_2O_3$ is less than 20.0 mol %.

2. The glass article of claim 1, wherein the glass comprises the following components in the proportions specified (in mol %):

| Component | Proportion (mol %) |
|---|---|
| $SiO_2$ | 1.0-16.5; |
| $B_2O_3$ | 0.0-13.5; |
| $Al_2O_3$ | 0.0-3.0; |
| BaO | 1.0-20.0; |
| ZnO | 0.0-5.0; |
| $La_2O_3$ | 5.0-20.0; |
| $TiO_2$ | 28.0-65.0; |
| $Nb_2O_5$ | 0.1-20.0; |

-continued

| Component | Proportion (mol %) |
|---|---|
| $Gd_2O_3$ | 0.0-8.0; |
| $WO_3$ | 0.0-5.0; |
| $Y_2O_3$ | 0.0-5.0; |
| $ZrO_2$ | 1.0-11.0; and |
| $\Sigma$ $La_2O_3$ + $Y_2O_3$ + $Gd_2O_3$ + $Yb_2O_3$ + $Lu_2O_3$ | 12.5-20.0. |

3. The glass article of claim 2, wherein the glass article consists of the glass.

4. The glass article of claim 1, having a refractive index no in a range of from 2.05 to 2.20.

5. The glass article of claim 1, wherein the glass article has a thickness in a range of from 0.2 to 3.0 mm.

6. The glass article of claim 1, having a surface roughness $R_q$ of <1 nm.

7. The glass article of claim 6, wherein the surface roughness $R_q$ is <0.5 nm.

8. The glass article of claim 1, having a Knoop hardness of >600.

9. The glass article of claim 8, wherein the Knoop hardness is >630.

10. The glass article of claim 9, wherein the Knoop hardness is >650.

11. The glass article of claim 1, wherein a pure transmission $\tau_i$ with a wavelength of 460 nm and a layer thickness d of 1 cm is >0.9.

12. The glass article of claim 1, wherein the R-number lies in a range of from >0.965 to <0.985.

13. The glass article of claim 1, wherein a ratio of a sum of proportions of $SiO_2$ and $B_2O_3$ (in mol %) to a sum of proportions of $La_2O_3$, $Y_2O_3$, $Gd_2O_3$, $Yb_2O_3$ and $Lu_2O_3$ (in mol %) lies in a range of from 0.5:1 to 1.3:1.

14. The glass article of claim 1, wherein the glass article is a wafer.

\* \* \* \* \*